United States Patent
Khrenov et al.

(10) Patent No.: US 8,962,728 B2
(45) Date of Patent: Feb. 24, 2015

(54) WEATHERING-RESISTANT, COLORED MOLDINGS WITH IMPROVED GLOSS AND WIPE RESISTANCE

(75) Inventors: Victor Khrenov, Frankfurt (DE); Andreas Mischlich, Weiterstadt (DE); Ursula Golchert, Dieburg (DE); Stefan Nau, Buettelborn (DE); Anton Halblaender, Griesheim (DE); Klaus Schultes, Wiesbaden (DE); Marc Poth, Reinheim (DE); Antonios Manis, Darmstadt (DE); Kathrin Lehmann, Leverkusen (DE); Zhen Zhu, Cheshire, CT (US)

(73) Assignee: Evonik Röhm GmbH, Darmstadt (DE)

( * ) Notice: Subject to any disclaimer, the term of this patent is extended or adjusted under 35 U.S.C. 154(b) by 66 days.

(21) Appl. No.: 13/824,624

(22) PCT Filed: Aug. 22, 2011

(86) PCT No.: PCT/EP2011/064326
§ 371 (c)(1),
(2), (4) Date: Apr. 18, 2013

(87) PCT Pub. No.: WO2012/034821
PCT Pub. Date: Mar. 22, 2012

(65) Prior Publication Data
US 2013/0203918 A1    Aug. 8, 2013

Related U.S. Application Data

(60) Provisional application No. 61/384,060, filed on Sep. 17, 2010.

(30) Foreign Application Priority Data

Sep. 22, 2010  (EP) .................................... 10178326

(51) Int. Cl.
*C08K 5/5419*    (2006.01)
(52) U.S. Cl.
USPC ............ 524/269; 524/588; 525/343; 525/350
(58) Field of Classification Search
USPC ........................ 524/269, 588; 525/343, 350
See application file for complete search history.

(56) References Cited

U.S. PATENT DOCUMENTS

| | | |
|---|---|---|
| 8,227,549 B2 | 7/2012 | Schultes et al. |
| 8,268,939 B2 | 9/2012 | Ebbrecht et al. |
| 2005/0257717 A1 | 11/2005 | Knott et al. |
| 2007/0055017 A1 | 3/2007 | Schultes et al. |
| 2007/0222117 A1 | 9/2007 | Hoess et al. |
| 2008/0132627 A1 | 6/2008 | Schultes et al. |
| 2010/0098907 A1 | 4/2010 | Schultes et al. |
| 2010/0167045 A1 | 7/2010 | Schultes et al. |
| 2010/0213636 A1 | 8/2010 | Schmidt et al. |
| 2010/0298455 A1 * | 11/2010 | Henning et al. ............... 521/112 |
| 2011/0136964 A1 | 6/2011 | Golchert et al. |
| 2011/0230610 A1 | 9/2011 | Schultes et al. |
| 2012/0015141 A1 | 1/2012 | Hoess et al. |
| 2012/0108735 A1 | 5/2012 | Kluge et al. |
| 2012/0321857 A1 | 12/2012 | Schmidt et al. |
| 2012/0322932 A1 | 12/2012 | Schultes et al. |

FOREIGN PATENT DOCUMENTS

| | | |
|---|---|---|
| CN | 1718613 | 1/2006 |
| CN | 1863864 | 11/2006 |
| CN | 1946797 A | 4/2007 |
| EP | 0 342 311 A2 * | 1/1989 |
| EP | 0 342 311 | 11/1989 |
| EP | 0 382 633 A1 * | 1/2004 |
| EP | 1 382 633 | 1/2004 |
| JP | H11-35778 | 2/1999 |
| JP | 2013-504680 | 2/2013 |

OTHER PUBLICATIONS

International Search Report Issued Oct. 19, 2011 in PCT/EP11/064326 Filed Aug. 22, 2011.
U.S. Appl. No. 13/984,167, filed Oct. 4, 2013, Dimov, et al.
U.S. Appl. No. 13,806,322, filed Dec. 21, 2012, Schwarz-Barac, et al.
Office Action issued in Application No. CN 201180051762.9, dated Oct. 13, 2014 w/English translation.
Office Action issued in Application No. JP 2013-528581, dated Oct. 14, 2014 w/English translation.

* cited by examiner

*Primary Examiner* — Robert D. Harlan
(74) *Attorney, Agent, or Firm* — Oblon, Spivak, McClelland, Maier & Neustadt, L.L.P.

(57) ABSTRACT

The present invention relates to weathering-resistant, colored moldings made of poly(alkyl)(meth)acrylate with improved gloss and resistance to mechanical influences acting on the surface of the molding, in particular with improved wipe resistance and improved scratch resistance, and also to molding compositions for producing the same.

15 Claims, No Drawings

WEATHERING-RESISTANT, COLORED MOLDINGS WITH IMPROVED GLOSS AND WIPE RESISTANCE

The present invention relates to weathering-resistant, colored moldings made of poly(alkyl)(meth)acrylate with improved gloss and resistance to mechanical influences acting on the surface of the molding, in particular with improved wipe resistance and improved scratch resistance, and also to molding compositions for producing the same.

Transparent plastics components are found in numerous applications: examples being panels of household equipment, and covers for instruments in motor vehicles; other examples are displays.

Polymethyl methacrylate (PMMA) molding compositions have high optical transparency and no intrinsic color, and therefore permit realization of a wide range of different colorings which are used for decorative covers (e.g. various panels in automobile interiors and automobile exteriors). Use of colored PMMA molding compositions also permits realization of surfaces in the highest quality class (known as Class A surfaces), this being an important factor in the final applications.

The surfaces of the components produced from PMMA have high hardness, and this is of decisive importance for final application of these in the form of a decorative cover. It is well-known that when PMMA is compared with other thermoplastic materials it has the highest surface hardness and scratch resistance, determined by the pencil hardness test. However, there are some applications with particularly stringent surface requirements, in particular for components that are decorative and prominent, where even PMMA moldings have to be protected from various types of wear. For this, the components are often equipped with a coating.

The susceptibility of plastics moldings to wipe marks and scratches is a general problem, since the articles concerned very rapidly become visually unattractive. Numerous methods have therefore been developed for providing plastics with scratch-resistant layers. The coating materials used are preferably curable plastics resins. Examples that may be mentioned are coatings of polyesters with a dialdehyde (e.g. U.S. Pat. No. 3,484,157), or polyurethanes (e.g. DE 2611782), or with alkyl titanate (e.g. U.S. Pat. No. 3,700,487), or melamine in a very wide variety of variants, or melamine polyol (e.g. GB 1308697, U.S. Pat. No. 3,862,261). Other materials that have been used for coating are acrylic resins of a very wide variety of types (e.g. DE 2317874), fluorinated hydrocarbons in a very wide variety of combinations and modifications (NL 6608316, DE 1963278, DE 2454076), crosslinked polyalkyleneimine compounds (U.S. Pat. No. 3,766,299) and silicon compounds, in particular silicone resins (e.g. BE 821403, U.S. Pat. No. 3,451,838, U.S. Pat. No. 3,707,397). EP 180129 describes a process for a coating composed of acrylate polymers or of methacrylate polymers, of organosilicon polymers or of melamine resins, where the coating has a scratch-resistant and antireflective effect on plastics.

A very wide variety of sol-gel systems have also been described, and these can be used inter alia with the aid of plasma processes. These systems are often produced from modified silanes and alkoxides via hydrolysis processes and condensation processes. The storage stability of the coating mixture is mostly very restricted by the reactivity of these systems. Radiation-curable coating compositions are also used for the coating of plastics substrates. By way of example, U.S. Pat. No. 6,420,451 describes radiation-curable coating compositions for the coating of optical substrates, such as lenses, made of various plastics substrates, e.g. polycarbonate. The coating compositions comprise urethane acrylates and colloidal metal oxides, in particular $SiO_2$ particles, alongside monofunctional acrylates.

A feature common to all of the processes described above is that they require additional and complicated operations, namely application and hardening of the coating system/coating composition.

Evonik Goldschmidt GmbH has therefore proposed, in EP 1 640 418, organomodified siloxanes as additives specifically for improving the scratch resistance of thermoplastic elastomers, in particular polyurethanes (TPU), polyamides (PEBA), copolyesters (COPE) and styrenols (STPE). These siloxanes are added in the form of an additive directly to the molding composition. They form a sort of lubricant film on the surface of the molding produced from the molding composition. This inhibits surface damage, the result being that the object acting on the molding can slide across the surface. It is claimed that the moldings therefore require no additional scratch-resistant coating.

A more detailed study of EP 1 640 418 reveals that the plastics that it uses are very much softer than PMMA. These plastics have an elastic surface and are therefore intrinsically less susceptible to mechanical effects caused by sharp or pointed objects. The requirements generated by those elastic polymers in respect of scratch-resistant modification are therefore quite different from those generated by, for example, the very hard surface of PMMA moldings. EP 1 640 418 does not give any indication that organomodified siloxanes can also improve the wipe resistance of surfaces of PMMA moldings. Nor is this derivable from EP 1 640 418, since, as stated, it uses polymers that are entirely different.

DE 100 59 454 likewise proposes additives having siloxane units, which are intended to improve the scratch resistance of surfaces of moldings made of various polymers. These are polyester-polysiloxane-modified polyolefins, which are obtained via reaction of anhydride-grafted polyolefins with hydroxy-functional organopolysiloxanes. Said polyester-polysiloxane copolymers are added in the form of additive into the polymer matrix. However, a disadvantage of this method is the complicated production of the polyester-polysiloxane copolymers.

The prior art says nothing about the effects of the various additives proposed in the prior art on the perceived color of the molding compositions.

There therefore continues to be a requirement for novel poly(alkyl)(methacrylate) molding compositions and, respectively, additives for poly(alkyl)(methacrylate) molding compositions which permit production of moldings, in particular colored moldings, very particularly black-colored moldings, with high color brilliance, high gloss and very good resistance to mechanical effects acting on the surface of the moldings, in particular wipe resistance and scratch resistance, without any need to use a coating for protection of the surface.

Starting from the prior art described above, the object of the present invention was therefore to provide plastics moldings modified so as to be wipe-resistant, and molding compositions for their production, where these do not have the disadvantages of the moldings and molding compositions of the prior art, or have these only to a reduced extent.

One specific object consisted in providing plastics moldings which have good resistance to mechanical effects, in particular wiping, without any additional scratch-resistant coating or foil.

Another object of the present invention was to provide plastics moldings or, respectively, molding compositions for production of these, where these have high color brilliance and high gloss, and also high surface quality. The intention is that no graying be discernible in particular when dark color shades are used, e.g. black or brown.

Other objects that are not explicitly mentioned are apparent from the overall circumstances described in the description, examples and claims below.

Surprisingly, it has now been found that the use of specifically structured organomodified polysiloxanes or of polysiloxane (block copolymers) having polysiloxane blocks and having polyester blocks can markedly improve the wipe resistance of surfaces of moldings produced from poly(alkyl) (meth)acrylates. It has moreover been found that these specific polysiloxanes or polysiloxane (block copolymers) can give dark-colored, in particular black-colored, molding compositions and moldings which have no graying.

Use of the molding compositions of the invention can produce colored plastics moldings with high surface quality and color brilliance, and these require no additional scratch-resistant coating or, respectively, foil in order to have very good capability to resist wiping, abrasion and scratching.

In comparison with the prior art, therefore, it is possible to save steps in the process and also to save costs for materials and for production of the moldings.

By using the present invention it has become possible for the first time to obtain wipe-resistant black moldings with no graying from poly(alkyl)(meth)acrylates, so that the excellent weathering resistance of these can be utilized. The moldings of the invention are therefore suitable for either indoor or outdoor use.

The inventors have discovered that it is in principle possible to use specific organomodified polysiloxanes and/or polysiloxane (block copolymers) to improve the resistance of surfaces of moldings made of poly(alkyl)(meth)acrylates to mechanical effects, in particular wiping and scratching. However, it has been found here that many of the polysiloxane additives marketed in order to improve the scratch resistance of polymer surfaces led to graying in the case of black moldings, or that it was impossible to achieve adequate wipe resistance. The comparative examples give further details in this connection. Confirmation has been obtained for the conclusions presented above in the description of the prior art, to the effect that additives that can be used to improve the scratch resistance of soft polymers cannot simply be transferred to hard polymers.

As a result of extensive studies, it has now been found that compounds of the formula (I)

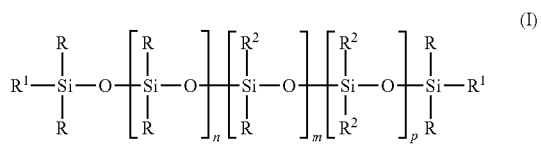

where R, $R^1$, $R^2$, n, m and p are as defined below are suitable for producing poly(alkyl)(meth)acrylate molding compositions and moldings which achieve the abovementioned objects in excellent fashion. The additive has no effect, or only very little adverse effect, on the surface quality of the poly(alkyl)(meth)acrylate moldings, and the moldings of the invention therefore have excellent surface quality.

The present invention therefore provides molding compositions comprising a poly(alkyl)(meth)acrylate matrix material and at least one compound of the formula (I).

The present invention also provides the use of the molding compositions of the invention for producing moldings.

The present invention therefore also provides moldings encompassing a plastic, comprising a poly(alkyl) (meth)acrylate matrix and a compound of the formula (I) as defined below.

Finally, the present invention provides the use of the moldings of the invention as decorative panels or functional add-on parts, in motor vehicles or consumer electronics or in household equipment.

There now follows a detailed description of the subject matter of the present invention.

"(Meth)acrylate" means either methacrylates or acrylates.

The molding compositions of the invention encompass
a) a poly(alkyl)(meth)acrylate matrix material
b) at least one compound of the formula (I)

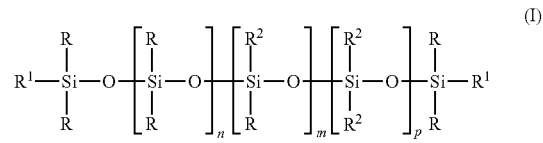

where
R, independently of one another, are an alkyl moiety having from 1 to 11, preferably from 1 to 4, carbon atoms, preferably a methyl moiety, $R^1$, independently of one another, are R or a polyester moiety, $R^2$, independently of one another, are R, a polyester moiety or a hydrocarbon moiety having from 12 to 36 carbon atoms, preferably from 20 to 30 carbon atoms, with preference from 24 to 30 carbon atoms, n, m and p, independently of one another, are from 0 to 58, with the proviso
that N=n+m+p+2 is from 15 to 75, preferably from 20 to 50, and
no $R^1$ is R when all $R^2$ are R, and at least one $R^2$ is not R when all $R^1$ are R and/or
no moiety $R^1$ is R when m and p are 0, and that m or p, preferably m, is not 0 when all moieties $R^1$ are R.

The indices used in the formulae are to be regarded as statistical average values (numeric averages).

Preference is given to the presence of those compounds of the formula (I) in which p=0.

If the moieties $R^1$ and/or $R^2$ are polyester moieties, these are preferably composed of from 3 to 30, preferably of from 8 to 25, and particularly preferably of from 15 to 25, ester units. The polyester moieties can have, as starter alcohols, those alcohol moieties which derive from primary unsaturated alcohols (see production process). The polyester moieties preferably have a structure according to formula (II):

where
$R^q$=—$(CH_2)_x$—O—,
$R^r$=C(O)—$(CH_2)_y$—O—
x=from 2 to 10, preferably from 3 to 7, in particular 6, and
y=from 2 to 10, preferably from 3 to 8, and with preference 4 or 5.
Z=from 3 to 30, preferably from 8 to 25, and particularly preferably from 15 to 25.

The terms "q" and "r" serve merely to distinguish the moieties from the other "R" moieties and are not any sort of numerically-based indices.

The polyester moieties can be composed of identical or different starting molecules. It is preferable that the polyester moieties are composed of identical starting molecules. Preferred polyester moieties are those obtained via, preferably ring-opening, (poly)esterification of lactones. The polyester moieties are particularly preferably those obtained via (poly) esterification of caprolactone or valerolactone, in particular of ε-caprolactone, 3,5,5-trimethylcaprolactone or δ-valerolactone, and particularly preferably ε-caprolactone. Preferred compounds of the formula (I) in which $R^1$ and/or $R^2$ are polyester moieties are those in which the polyester moiety is composed of from 3 to 30 ε-caprolactone units, preferably from 8 to 25 ε-caprolactone units, and particularly preferably from 15 to 25 ε-caprolactone units. The moieties $R^1$ are preferably identical polyester moieties.

It can be advantageous that, alongside the moieties $R^1$, one or more of the moieties $R^2$ is also a polyester moiety. If, in the compounds of the formula (I), not only the $R^1$ moieties but also one or more of the $R^2$ moieties are polyester moieties, these polyester moieties are preferably identical (have the same number of units of the starting molecule).

If all of the moieties $R^1$ are R, where R is preferably a methyl moiety, $R^2$ is preferably a hydrocarbon moiety having from 12 to 36 carbon atoms, preferably from 20 to 30 carbon atoms, with preference from 24 to 30 carbon atoms, and then N is preferably greater than or equal to 30, preferably from 40 to 50. In that case p is preferably 0, and m is preferably from 30 to 48.

If one or more of the moieties $R^1$ and/or $R^2$ is a polyester moiety, then N is preferably from 10 to 45, preferably from 20 to 30 and particularly preferably from 20 to less than 30. If the $R^2$ moieties are polyester moieties, p is preferably 0, and the value of m is from 1 to 10, with preference from 2 to 5.

The compounds used of the formula (I) are preferably those in which the moieties $R^2$ are either exclusively polyester moieties or exclusively hydrocarbon moieties having from 12 to 36 carbon atoms.

Preferred compounds of the formula (I) in which the $R^2$ moieties present are exclusively hydrocarbon moieties are those in which $R^1$=R=methyl, N=from 40 to 50, in particular 40 or 50, and the moieties $R^2$ are alkyl moieties having 30 carbon atoms or a mixture of alkyl moieties having from 24 to 28 carbon atoms.

Preferred compounds of the formula (I) in which the $R^1$ and/or $R^2$ moieties present are exclusively polyester moieties are those in which R=methyl and N=from 20 to 45, and in which the polyester moieties have from 15 to 25 ester units.

Particularly preferred compounds of the formula (I) where p=0, Rq=hexanol moiety and R=methyl can be found in table 1 below.

TABLE 1

Particularly preferred compounds of the formula (I)

| N | m | $R^1$ | $R^2$ |
|---|---|---|---|
| 30 | 0 | In each case polyester moiety having 20 caprolactone units | — |
| 50 | 48 | Methyl | Alkyl moiety having from 24 to 28 carbon atoms |
| 22 | 0 | In each case polyester moiety having 18 caprolactone units | |
| 30 | 2 | In each case polyester moiety having 15 caprolactone units | In each case polyester moiety having 15 caprolactone units |
| 43 | 5 | Methyl | In each case polyester moiety having 25 caprolactone units |
| 40 | 38 | Methyl | Alkyl moiety having from 24 to 28 carbon atoms |
| 50 | 30 | Methyl | Alkyl moiety having 30 carbon atoms |

Examples of suitable compounds of the formula (I) are TEGOMER® H-Si 6440 P and TEGOPREN 6846, which can be obtained from Evonik Goldschmidt GmbH.

The compounds of the formula (I) can be obtained by the known processes via reaction of corresponding hydrosiloxanes with unsaturated hydrocarbons or unsaturated alcohols and subsequent (poly)esterification, or via direct reaction of unsaturated polyesters with hydrosiloxanes. The reaction can be carried out as described in EP 1 640 418 via hydrosilylation or via dehydrogenative hydrosilylation. The production of polysiloxanes having polyester moieties can be found by way of example in EP 0 208 734. In order to avoid simply repeating the text, the contents of said patent specifications are hereby explicitly incorporated into the content of the description of the present invention.

The molding compositions of the invention preferably comprise further additives, such as colorants, pigments and/ or organic dyes, light stabilizers, UV stabilizers, UV absorbers, IR absorbers, antimicrobial active ingredients, flame retardants, heat stabilizers, antioxidants, crosslinking polymers, and fiber-reinforcing additives of organic or inorganic type. It is preferable that no more than 10% by weight, particularly preferably no more than 5% by weight and in particular no more than 2% by weight, of auxiliaries and fillers are present in the molding compositions and moldings of the invention.

It is particularly preferable that the molding compositions and moldings of the invention have been colored with dark color shades, in particular blue, green, brown or black.

In one particularly preferred embodiment, the molding compositions or the moldings of the invention comprise an impact modifier, its proportion in particular being from 0.1 to 15% by weight, preferably from 0.5 to 10% by weight and very particularly preferably from 1 to 6% by weight, based in each case on the total mass of the molding composition or, respectively, of the molding. It is possible to use any of the commercially available impact modifiers, in particular elastomer particles with an average particle diameter of from 10 to 300 nm (measured by way of example by the ultracentrifuge method). It is preferable that the elastomer particles have a core using a soft elastomer phase, and have at least one hard phase bonded thereto.

The poly(alkyl)(meth)acrylate matrix material used according to the invention as component a) is preferably homo- or copolymers of methyl methacrylate. The invention also encompasses mixtures, and also blends of various poly (alkyl) (meth)acrylates and of other polymers. The present invention also provides a copolymer made of at least one poly(alkyl) (meth)acrylate and of other comonomers. Component a) of the invention is not a thermoplastic elastomer.

"Alkyl" here means branched or unbranched, cyclic or linear alkyl moieties having from 1 to 20 carbon atoms, preferably from 1 to 8 carbon atoms, particularly preferably from 1 to 4 carbon atoms, where these can have substitution by functional groups, or can comprise heteroatoms, such as O, S or N. Preference is given to a methyl, ethyl, butyl or cyclohexyl moiety.

In one first preferred embodiment, component a) is a mixture encompassing a copolymer (I) and a (co)polymer (II). This mixture and the copolymers are described in more detail below.

The copolymer (I) of the mixture is polymerized from 80 to 100% by weight, preferably from 90 to 100% by weight, in particular from 99 to 100% by weight, of methyl methacrylate, styrene and maleic anhydride and, if appropriate, from 0 to 20% by weight, preferably from 0 to 10% by weight, in particular from 0 to 1% by weight, of other comonomers capable of free-radical polymerization, preferably α-methylstyrene or $C_1$-$C_4$-alkyl(meth)acrylates, in particular methyl acrylate, ethyl acrylate or butyl acrylate, in particular n-butyl acrylate. It is particularly preferable that the copolymer (I) is composed exclusively of units of methyl methacrylate, styrene and maleic anhydride that have been polymerized by a free-radical route.

Quantitative proportions that have proven to be particularly preferred are:
 from 65 to 85% by weight, preferably from 70 to 80% by weight, of methyl methacrylate,
 from 10 to 20% by weight, preferably from 12 to 18% by weight, of styrene and
 from 5 to 15% by weight, preferably from 8 to 12% by weight, of maleic anhydride,
where the present invention encompasses only those combinations of the three monomers which give a total of 100% by weight. From the abovementioned quantitative data it is also theoretically possible to construct three-way combinations which give less than or more than 100% by weight, but these are not provided by the present invention. A person skilled in the art can easily determine combinations according to the invention within the scope of the abovementioned quantitative ranges.

The solution viscosity of the copolymer (I) in chloroform is smaller than or equal to 55 ml/g at 25 C (ISO 1628—part 6), preferably smaller than or equal to 50 ml/g, in particular from 40 to 55 ml/g, particularly preferably from 43 to 50 ml/g.

The molar mass Mw (weight average) of copolymer (I) is preferably in the range from 50 000 to 250 000 g/mol and particularly preferably in the range from 70 000 to 120 000 g/mol (determination of Mw by means of gel permeation chromatography with reference to polymethyl methacrylate as calibration standard).

The (co)polymer (II) of the mixture is polymerized from 80 to 100% by weight, preferably from 90 to 99.5% by weight, of methyl methacrylate units and, if appropriate, from 0 to 20% by weight, preferably from 0.5 to 10% by weight, of other monomers capable of free-radical copolymerization with methyl methacrylate, preferably $C_1$-$C_4$-alkyl(meth)acrylates, in particular methyl acrylate, ethyl acrylate or butyl acrylate, in particular n-butyl acrylate.

In one particularly preferred embodiment, the (co)polymer (II) is composed of from 95 to 99.5% by weight of methyl methacrylate units and from 0.5 to 5% by weight, preferably from 1 to 4% by weight of one of the abovementioned monomers capable of free-radical copolymerization with methyl methacrylate, in particular methyl acrylate.

The solution viscosity of the (co)polymer (II) in chloroform at 25 C (ISO 1628—part 6) is from 50 to 55 ml/g, preferably from 52 to 54 ml/g.

The molar mass Mw (weight average) of (co)polymer (II) is preferably in the range from 80 000 to 200 000 g/mol, preferably from 90 000 to 200 000 g/mol, and particularly preferably in the range from 100 000 to 150 000 g/mol. Molar mass Mw is determined as described for copolymer (I).

The Vicat softening point VSP (ISO 306-B50) of the (co)polymer (II) can preferably be at least 107° C., preferably from 108 to 114° C., and/or its melt index MVR (ISO 1133, 230 C/3.8 kg) can preferably be in the range greater than or equal to 2.5 cm/10 min.

It is preferable that the ratio of the copolymers (I) to the (co)polymers (II) is from 95:5 to 5:95, preferably from 20:80 to 80:20, in particular from 20:60 to 80:40, based in each case on parts by weight.

Details concerning the mixture described above, and also concerning the production of the individual polymers and of the polymer mixture, can be found in WO 2005/108486. In order to avoid repetition, the subject matter of said application is hereby explicitly incorporated into the description of the present application.

In a second preferred embodiment, the matrix material a) is a polymer mixture which comprises the following components:
 A) a low-molecular-weight (meth)acrylate (co)polymer, characterized by a solution viscosity smaller than or equal to 55 ml/g in chloroform at 25° C. (ISO 1628—part 6), where component A) preferably corresponds to the copolymer (I) described above in the first preferred embodiment
 and/or
 B) a relatively high-molecular-weight (meth)acrylate (co)polymer,
 characterized by a solution viscosity greater than or equal to 65 ml/g in chloroform at 25° C. (ISO 1628—part 6)
 and/or
 C) another (meth)acrylate (co)polymer different from A), characterized by a solution viscosity of from 50 to 55 ml/g in chloroform at 25° C. (ISO 1628—part 6), where components A), B) and/or C) can each per se be individual polymers or else a mixture of polymers, where the entirety of A), B) and/or C) is 100% by weight.

Component B) is an optional component, which can be present alone or together with component C). Component B) can have the same monomer constitution as component A). The production process can be substantially analogous, except that the polymerization parameters are selected in such a way as to give polymers of relatively high molecular weight and therefore relatively high solution viscosity in chloroform. This can be achieved by way of example by reducing the amount of molecular-weight regulator used.

Component B) is a relatively high-molecular-weight (meth)acrylate (co)polymer, characterized by a solution viscosity greater than or equal to 65 ml/g, preferably from 68 to 75 ml/g, in chloroform at 25° C. (ISO 1628—part 6).

This can correspond to a molar mass Mw (weight average) of from 100 000 to 300 000 g/mol and particularly preferably in the range from 120 000 to 180 000 g/mol (determination see above).

Component C) is an optional component, which can be used alone or together with component B). Component C) preferably corresponds to the (co)polymer (II) described above for the first preferred embodiment.

The quantitative proportions of components A) to C) present are particularly preferably as follows, where these give a total of 100% by weight.

Component A): from 50 to 90% by weight, preferably from 60 to 88% by weight.

Component B): and/or C): from 10 to 50% by weight, preferably from 12 to 40% by weight.

In one specifically preferred modification of the 2nd preferred embodiment, the polymer matrix also encompasses an impact modifier D). In this case, the quantitative proportions present of components A) to D) are as follows, where these give a total of 100% by weight.

Component A): from 25 to 75% by weight, preferably from 40 to 60% by weight, in particular from 45 to 57% by weight, Component B) and/or C): from 10 to 50% by weight, preferably from 12 to 44% by weight, Component D): from 7 to 60% by weight, preferably from 7 to 20% by weight.

Further details concerning the polymer mixture described above, the individual components, and also the production of the individual components and of the polymer mixture can be found in EP 1673409 and EP 1844102. In order to avoid repetition, the subject matter of those applications is hereby explicitly incorporated into the description of the present application.

In a third particularly preferred embodiment, component a) used according to the invention can comprise a blend made of a relatively high-molecular-weight (meth)acrylate (co)polymer, characterized by a solution viscosity of from 50 to 55 ml/g in chloroform at 25° C. (ISO 1628—part 6), as described for the preferred embodiment 2, and a styrene/maleic anhydride copolymer, particularly preferably a copolymer from the Xiran® group of products.

The molding compositions of the invention preferably comprise from 0.1 to 10% by weight, particularly preferably from 0.3 to 5% by weight, very particularly preferably an amount in the range from 0.5 to 4.0% by weight and specifically preferably an amount in the range from 1 to 3% by weight, of polysiloxane component b).

Any of the processes known to the person skilled in the art can be used for incorporating component b) of the invention. By way of example, the matrix polymer is premixed with polysiloxane component b) and with possible other ingredients, e.g. pigments, fillers and other additives, e.g. antioxidants or antistatic additives. The premixing process uses mixing assemblies such as Henschel mixers or tumbling mixers.

Compounds of the invention are then preferably embedded with the action of shear forces, an example being incorporation into the polymer in an extruder. As an alternative, it is also conceivable to incorporate the material in a kneader, or with melting in a reactor.

The molding compositions of the invention can be used in any of the processes known to the person skilled in the art to produce the moldings of the invention.

Preferred processes are injection molding, thermoforming or extrusion, and particular preference is given here to various embodiments of the injection-molding process.

The moldings of the invention can be produced entirely from the molding composition of the invention, and this is preferred.

However, the product can also be a multipart component, e.g. produced via coextrusion, multicomponent injection molding, etc., in which only one or more layers/portions of the molding are produced from the molding composition of the invention. In this case, the proportion of the molding composition of the invention in the entire molding is preferably from 0.1 to 99.9% by weight, particularly preferably from 10 to 30% by weight.

A feature of the moldings of the invention is, inter alia, that they have a surface of the highest quality and can be protected from damage or loss of surface quality with the aid of the polymethyl methacrylate and of the addition of the above-mentioned additives.

Even if the particular advantage of the moldings of the invention is considered to be that the surface is scratch-resistant and wipe-resistant, this does not exclude the use of a film or of a coating for complete or partial coating of the moldings produced according to the invention.

The moldings of the invention can preferably be used as decorative panels or functional add-on parts, in motor vehicles or consumer electronics or in household equipment.

Test Methods:

The molding compositions were tested as follows:

| | |
|---|---|
| Mini-Vicat | Determination of Vicat softening point in a mini-Vicat system. Test standard DIN ISO 306 |
| MVR | MVR melt viscosity was determined in accordance with test standard ISO 1133 |
| Crockmaster 670 | determined to EN ISO X12 or BS 1006 X12 with crocking cloth and an applied weight of 9N and movable cylinder with diameter level 1.5 cm, scratch damage being assessed after 100 and 250 traverses, 100 forward/reverse traverses per minute, Producer: James H. Heal, UK |
| Multifinger test | Taber 710, determined to BN 108-13 or GMN 3943. The test determines whether various weights applied to a pin tip (diameter 1 mm), resulting in 2, 5, 10, 12 and 15N, give a visible scratch. The five pin tips here move at 7.5 meters per minute across the area to be scratch-tested, and surfaces based on the invention exhibit fewer scratches or less scratch depth than surfaces of moldings not treated according to the invention, Producer: Elcometer |
| Gloss | determined to DIN 5036 |

The examples below serve for further explanation of, or to improve understanding of, the present invention, but in no way restrict the same.

EXAMPLES

General Description

Compounded molding composition materials were produced in a ZSK30 machine (Werner&Pfleiderer). The compounded materials were then processed in a DEMAG injection-molding machine to give sheets of dimensions 200*100*3 mm.

Inventive Example 1

9.7 kg of PLEXIGLAS® 8N from Evonik Röhm GmbH which had been colored black were mixed in a tumbling mixer with 0.3 kg of TEGOMER® H-Si 6440P from Evonik Goldschmidt GmbH and extruded as explained in the general description to give a compounded material.

Inventive Example 2

9.7 kg of a molding composition according to example A of WO 2005/108486 which had been colored black were mixed in a tumbling mixer with 0.3 kg of TEGOMER® H-Si 6440P and extruded as explained in the general description to give a compounded material.

Inventive Example 3

9.7 kg of a molding composition according to example B of WO 2005/108486 which had been colored black were mixed in a tumbling mixer with 0.2 kg of TEGOMER® H-Si 6846P from Evonik Goldschmidt GmbH and extruded as explained in the general description to give a compounded material.

Comparative Example 1

Analogous to inventive example 1, but without addition of TEGOMER H-Si 6440P.

Comparative Example 2

Analogous to inventive example 2, but without addition of TEGOMER H-Si 6440P.

TABLE 2

Summary of properties of materials

| Property | Inventive example 1 | Inventive example 2 | Inventive example 3 | Comparative example 1 | Comparative example 2 |
|---|---|---|---|---|---|
| Vicat, ° C. | 104 | 109 | 102.2 | 108 | 115 |
| MVR, ml/10 min | 4.9 | 7.7 | | 3 | 4.5 |
| Gloss at 20° | 83.3 | 80.9 | | 81.1 | 79.9 |
| Gloss at 60° | 88.7 | 86.7 | | 87.4 | 88.1 |
| Gloss at 85° | 99.3 | 98.8 | | 98.1 | 96.1 |
| Scratch resistance (multifinger test) | No adverse effects at 15N | Slight adverse effects at 15N | Slight adverse effects at 15N | Adverse effects starting at 2N | Adverse effects starting at 2N |
| Wipe resistance (Crockmaster) | Slight adverse effects after 250 traverses | No adverse effects after 250 traverses | Slight adverse effects after 250 traverses | Severe adverse effects after 100 traverses | Severe adverse effects after 100 traverses |

The examples show the improvements achieved via the invention described here:

Incorporation of 3% by weight of TEGOMER® H-Si 6440P reduces the adverse effects produced by mechanical stress on the surfaces of the injection moldings.

Incorporation of 3% by weight of TEGOMER® H-Si 6440P improves the gloss of the surfaces of the injection moldings.

Comparative Example 3

A molding composition according to inventive example 1 was produced, but in each case 2%, by weight of the polysiloxane additives specified in table 3 were added. Table 3 also contains a specimen without additive, for comparison.

TABLE 3

| Additive | Perceived color/ Graying | Haze |
|---|---|---|
| No additive | Brilliant | No |
| TEGOMER ® V-Si 4042P | Gray | No |
| TEGOMER ® M-Si 2650P | Slightly gray | No |
| TEGOMER ® RC 902 | Gray | Yes |
| according to inventive example 1 | Brilliant | No |
| according to inventive example 2 | Brilliant | No |

Table 3 shows that only the additives of the invention can give brilliant black hues without graying and haze, and that some commercially available polysiloxane scratch-resistance additives give markedly poorer results.

The invention claimed is:
1. A molding composition comprising:
a poly(alkyl)(meth)acrylate matrix material; and
a compound of formula (I):

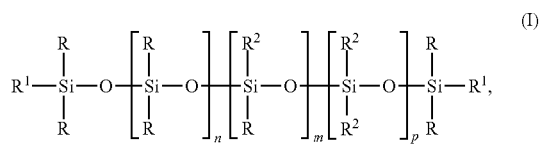

wherein each R is independently an alkyl moiety having from 1 to 11 carbon atoms;
each $R^1$ is independently R or a polyester moiety;
each $R^2$ is independently R, a polyester moiety, or a hydrocarbon moiety having from 12 to 36 carbon atoms;
n, m, and p, are independently an integer of from 0 to 58; with the proviso that
N=n+m+p+2 and N is from 15 to 75; no $R^1$ is R when all $R^2$ are R, and at least one $R^2$ is not R when all $R^1$ are R; no $R^1$ is R when m and p are 0, and m or p, is not 0 when all $R^1$ are R; or any combination thereof.

2. A molding, comprising:
a poly(alkyl)(meth)acrylate matrix material; and
a compound of formula (I):

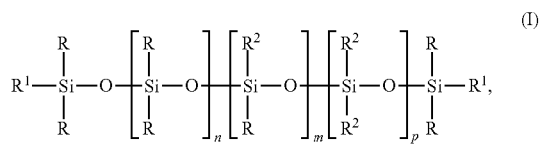

wherein each R is independently an alkyl moiety having from 1 to 11 carbon atoms;
each $R^1$ is independently R or a polyester moiety;
each $R^2$ is independently R, a polyester moiety, or a hydrocarbon moiety having from 12 to 36 carbon atoms;
n, m, and p, are independently an integer of from 0 to 58; with the proviso that N=n+m+p+2 and N is from 15 to 75; no $R^1$ is R when all $R^2$ are R, and at least one $R^2$ is not R when all $R^1$ are R; no $R^1$ is R when m and p are 0, and m or p, is not 0 when all $R^1$ are R; or any combination thereof.

3. The molding composition according to claim 1, wherein the molding composition is colored.

4. The molding composition according to claim 1, wherein a concentration of the compound is from 0.1 to 10% by weight.

5. The molding composition according to claim 1, comprising a dye, a light stabilizer, an IR absorber, an antimicrobial active ingredient, a flame retardant, a heat stabilizer, an antioxidant, a crosslinking polymer, a fiber-reinforcing additive of organic or inorganic type, or any combination thereof.

6. The molding composition according to claim 1, comprising an impact modifier based in each case on a total mass of the molding composition.

7. The molding composition according to claim 1, wherein, if the polyester moiety is present in the molding composition,
either the polyester moiety comprises from 3 to 30 ester units,
the polyester moiety has, as a starter alcohol, an alcohol moiety which derives from a primary unsaturated alcohol,
or both,
where each polyester moiety is composed of an identical or different starting molecule.

8. The molding composition according to claim 1,
wherein p is 0;
alongside $R^1$, one or more of $R^2$ is also a polyester moiety;
all $R^1$ are R, each $R^2$ is a hydrocarbon moiety having from 12 to 36 carbon atoms, N is greater than or equal to 30, p is 0, and m is an integer of from 30 to 48;
one or more of $R^1$ and/or $R^2$ is a polyester moiety, wherein N is an integer of from 10 to 45, and m is an integer of from 1 to 10;
$R^2$ are either exclusively polyester moieties or exclusively hydrocarbon moieties having from 12 to 36 carbon atoms;
$R^2$ are exclusively hydrocarbon moieties, wherein both $R^1$ and R are methyl, N is an integer of from 40 to 50, and $R^2$ are alkyl moieties having 30 carbon atoms or a mixture of alkyl moieties having from 24 to 28 carbon atoms;
$R^1$ and/or $R^2$ are exclusively polyester moieties, wherein R is methyl, N is an integer of from 20 to 45, and the polyester moieties have from 15 to 25 ester units; or
p is 0, $R^q$ is hexanol moiety, and R is methyl.

9. The molding composition according to claim 1, comprising the compound of the formula (I),
wherein p is 0, $R^q$ is a hexanol moiety, and R are methyl, and n, m, $R^1$, and $R^2$ are defined by a combination selected from the group consisting of:
i) N=30, m=0, and each $R^1$ is a polyester moiety having 20 caprolactone units;
ii) N=50, m=48, $R^1$ are methyl, and $R^2$ are an alkyl moiety having from 24 to 28 carbon atoms;
iii) N=22, m=0, and each $R^1$ is a polyester moiety having 18 caprolactone units;
iv) N=30, m=2, each $R^1$ is a polyester moiety having 15 caprolactone units, and each $R^2$ is a polyester moiety having 15 caprolactone units;
v) N=43, m=5, $R^1$ are methyl, and each $R^2$ is a polyester moiety having 25 caprolactone units;
vi) N=40, m=38, $R^1$ are methyl, and $R^2$ are an alkyl moiety having 24 to 28 carbon atoms; and
vii) N=50, m=30, $R^1$ are methyl, and $R^2$ are an alkyl moiety having 30 carbon atoms.

10. The molding composition according to claim 1,
wherein the poly(alkyl)(meth)acrylate matrix material is a mixture comprising a copolymer (I) and a (co)polymer (II),
wherein the copolymer (I) is polymerized from 80 to 100% by weight, of methyl methacrylate, styrene, and maleic anhydride and
the (co)polymer (II) is polymerized from 80 to 100% by weight of methyl methacrylate units and from 0 to 20% by weight of other monomers capable of free-radical copolymerization with methyl methacrylate.

11. The molding composition according to claim 1,
wherein the poly(alkyl)(meth)acrylate matrix material is a polymer mixture comprising:
A) a low-molecular-weight (meth)acrylate (co)polymer having a solution viscosity smaller than or equal to 55 ml/g in chloroform at 25° C. (ISO 1628—part 6);
B) a relatively high-molecular-weight (meth)acrylate (co)polymer having a solution viscosity greater than or equal to 65 ml/g in chloroform at 25° C. (ISO 1628—part 6);
C) another (meth)acrylate (co)polymer different from A) having a solution viscosity of from 50 to 55 ml/g in chloroform at 25° C. (ISO 1628—part 6);
or any combination thereof,
wherein each of components A), B) and/or C) can be an individual polymer or a mixture of polymers and a sum of the components A), B) and/or C) is 100% by weight.

12. The molding composition according to claim 1,
wherein the poly(alkyl)(meth)acrylate matrix material is a polymer mixture of a relatively high-molecular-weight (meth)acrylate (co)polymer having a solution viscosity of from 50 to 55 ml/g in chloroform at 25° C. (ISO 1628—part 6) and, the poly(alkyl)(meth)acrylate matrix material is a styrene/maleic anhydride copolymer.

13. A process of producing a molding, the process comprising producing the molding with the molding composition according to claim 1.

14. A process of producing an article, the process comprising producing the article with the molding composition according to claim 1,
wherein the article is suitable for a decorative panel or a functional add-on part, in a motor vehicle or a consumer electronic, or in household equipment.

15. The molding composition according to claim 7,
wherein, if the polyester moiety is present in the molding composition, the polyester moiety is of formula (II):

$$R^q\text{—}(R^r)_z \qquad (II),$$

wherein $R^q$ is —$(CH_2)_x$—O—,
$R^r$=C(O)—$(CH_2)_y$—O—,
x is an integer of from 2 to 10,
y is an integer of from 2 to 10, and
Z is an integer of from 3 to 30.

* * * * *